(12) United States Patent
Berglind et al.

(10) Patent No.: US 11,835,076 B1
(45) Date of Patent: Dec. 5, 2023

(54) AXIAL LOCKING MECHANISMS AND METHODS FOR SUPPORTING A WORKPIECE

(71) Applicant: The Boeing Company, Arlington, VA (US)

(72) Inventors: Luke A. Berglind, Brentwood, MO (US); Stephen L. Farabee, Wentzville, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/163,962

(22) Filed: Feb. 3, 2023

(51) Int. Cl.
*F16B 21/16* (2006.01)

(52) U.S. Cl.
CPC .................. *F16B 21/16* (2013.01)

(58) Field of Classification Search
CPC ............. F16B 21/16; B23Q 1/28; B23Q 3/06
See application file for complete search history.

(56) References Cited

U.S. PATENT DOCUMENTS

| | | | | |
|---|---|---|---|---|
| 5,300,881 A | * | 4/1994 | Ferrer | G01R 1/07328 324/750.2 |
| 5,311,120 A | * | 5/1994 | Bartholomew | G01R 1/04 324/750.19 |
| 6,169,412 B1 | * | 1/2001 | Byers | G01R 31/2887 324/756.07 |
| 6,283,464 B1 | * | 9/2001 | Byers | G01R 1/0466 269/903 |
| 7,866,642 B2 | | 1/2011 | McAllister | |
| 10,272,531 B1 | | 4/2019 | Miller | |
| 2008/0127474 A1 | * | 6/2008 | McAllister | B23Q 1/037 269/21 |
| 2019/0255667 A1 | * | 8/2019 | Miller | B23Q 3/066 |

FOREIGN PATENT DOCUMENTS

JP   2000009125 A  *  1/2000

OTHER PUBLICATIONS

Ibata et al.; Protective Cap for Bolt and Nut; Jan. 11, 2000; EPO English Machine Translation; pp. 1-12 (Year: 2023).*
Blue Photon, "Workholding Solutions for 5-Axis CNC Machines," (2023). https://www.bluephotongrip.com.

* cited by examiner

*Primary Examiner* — Bayan Salone
(74) *Attorney, Agent, or Firm* — Walters & Wasylyna LLC

(57) ABSTRACT

An axial locking mechanism includes a lock and a rod. The lock includes a lock aperture and an axis passing through the lock aperture. The rod is receivable by the lock aperture along the axis. In a first rotational orientation about the axis, the rod is movable within the lock aperture along the axis and relative to the lock. In a second rotational orientation about the axis, the rod is fixed within the lock aperture along the axis and relative to the lock.

20 Claims, 15 Drawing Sheets

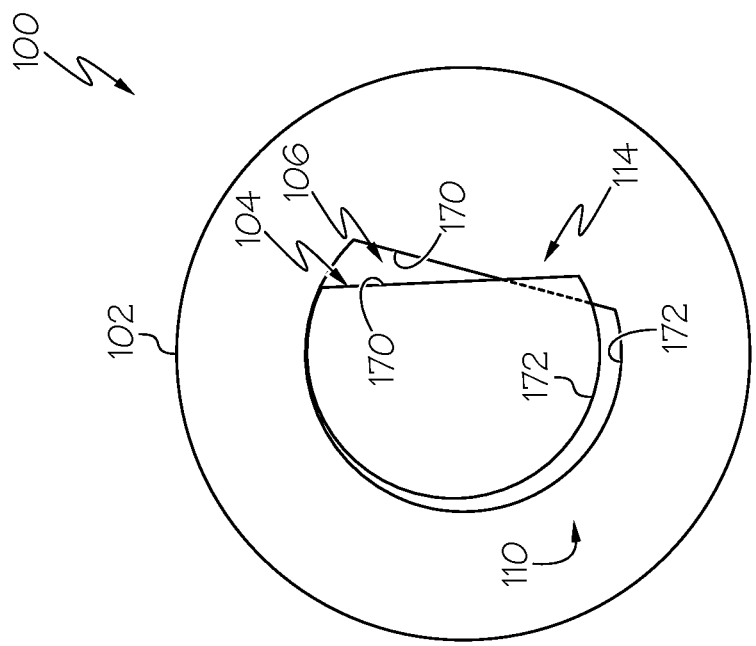
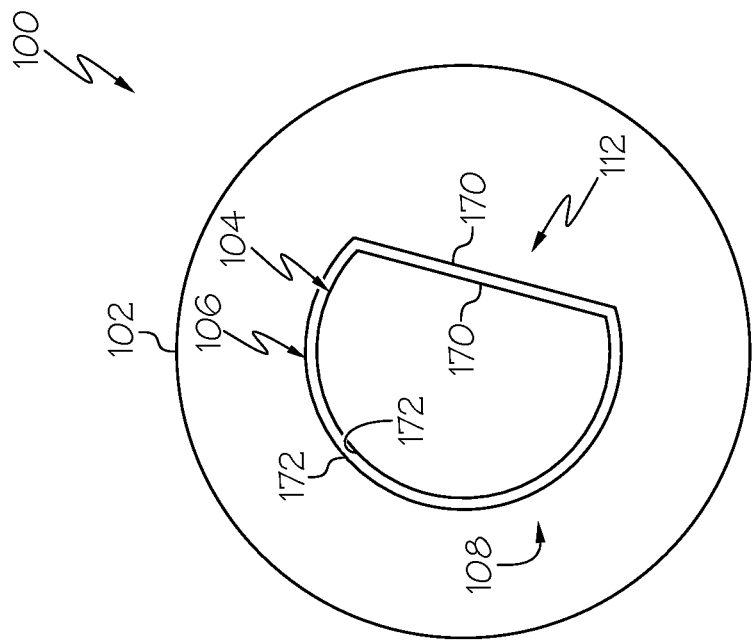
FIG. 9
FIG. 8

US 11,835,076 B1

AXIAL LOCKING MECHANISMS AND METHODS FOR SUPPORTING A WORKPIECE

FIELD

The present disclosure relates generally to locking mechanisms and, more particularly, to axial locking mechanisms and methods for supporting a workpiece using axial locking mechanisms.

BACKGROUND

Tooling fixtures are often used to rigidly support a workpiece while various manufacturing operations are performed. However, such tooling fixtures are expensive. Therefore, tooling fixtures may not be economically viable for small production runs. Additionally, tooling fixtures that a capable of adapting to different workpiece geometries are often complex and can apply an undesirable preload or stress on the workpiece during adjustment. Accordingly, those skilled in the art continue with research and development efforts in the field of adaptive supports for tooling fixtures.

SUMMARY

Disclosed are examples of an axial locking mechanism, an adaptive tooling fixture, and a method for supporting a workpiece. The following is a non-exhaustive list of examples, which may or may not be claimed, of the subject matter according to the present disclosure.

In an example, the disclosed axial locking mechanism includes a lock and a rod. The lock includes a lock aperture and an axis passing through the lock aperture. The rod is receivable by the lock aperture along the axis. In a first rotational orientation about the axis, the rod is movable within the lock aperture along the axis and relative to the lock. In a second rotational orientation about the axis, the rod is fixed within the lock aperture along the axis and relative to the lock.

In an example, the disclosed adaptive tooling fixture includes a base and a plurality of axial locking mechanisms coupled to the base. Each one of the axial locking mechanisms includes a lock and a rod. The lock includes a lock aperture and an axis passing through the lock aperture. The rod is insertable through the lock aperture along the axis. In a first rotational orientation about the axis, the rod is movable within the lock aperture along the axis and relative to the lock. In a second rotational orientation about the axis, the rod is fixed within the lock aperture along the axis and relative to the lock.

In an example, the disclosed method includes steps of: (1) in a first rotational orientation, moving a rod along an axis within a lock aperture of a lock until an end of the rod is in contact with a workpiece; (2) rotating at least one of the rod and the lock about the axis to a second rotational orientation; and in the second rotational orientation, fixing the rod along the axis within the lock aperture.

Other examples of the axial locking mechanism, the adaptive tooling fixture, and the method disclosed herein will become apparent from the following detailed description, the accompanying drawings, and the appended claims.

BRIEF DESCRIPTION OF THE DRAWINGS

FIG. 8 is a schematic, plan view of an example of the axial locking mechanism in an unlocked state;

FIG. 9 is a schematic, plan view of an example of the axial locking mechanism of FIG. 8 in a locked state;

DETAILED DESCRIPTION

Figure 25:
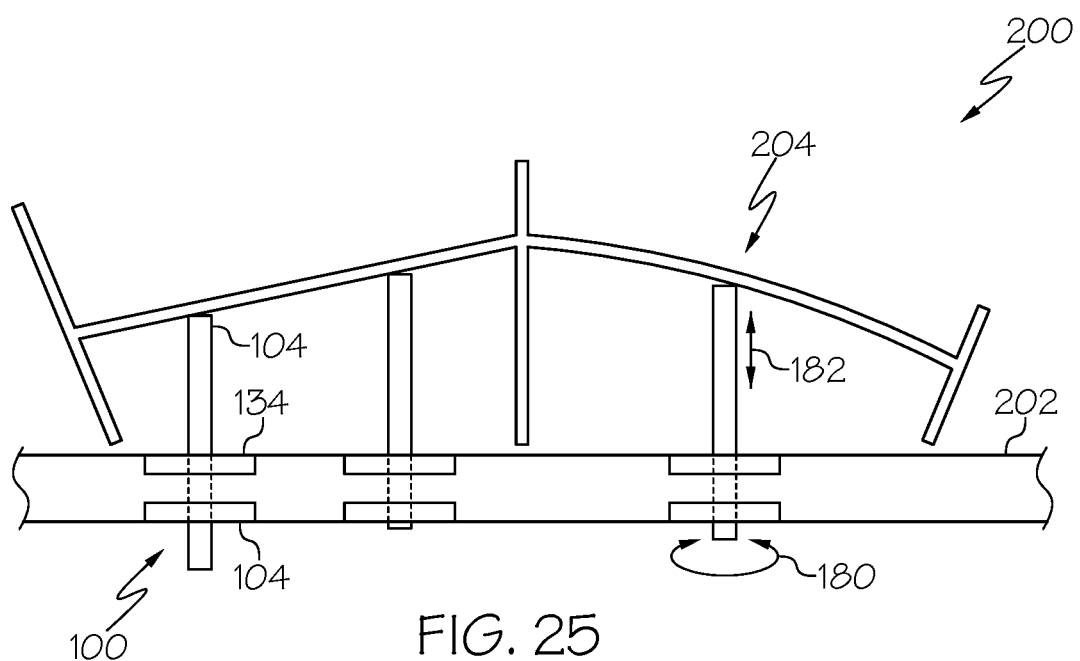
FIG. 25 is a schematic illustration of an example of the adaptive tooling fixture.
Figure 26:
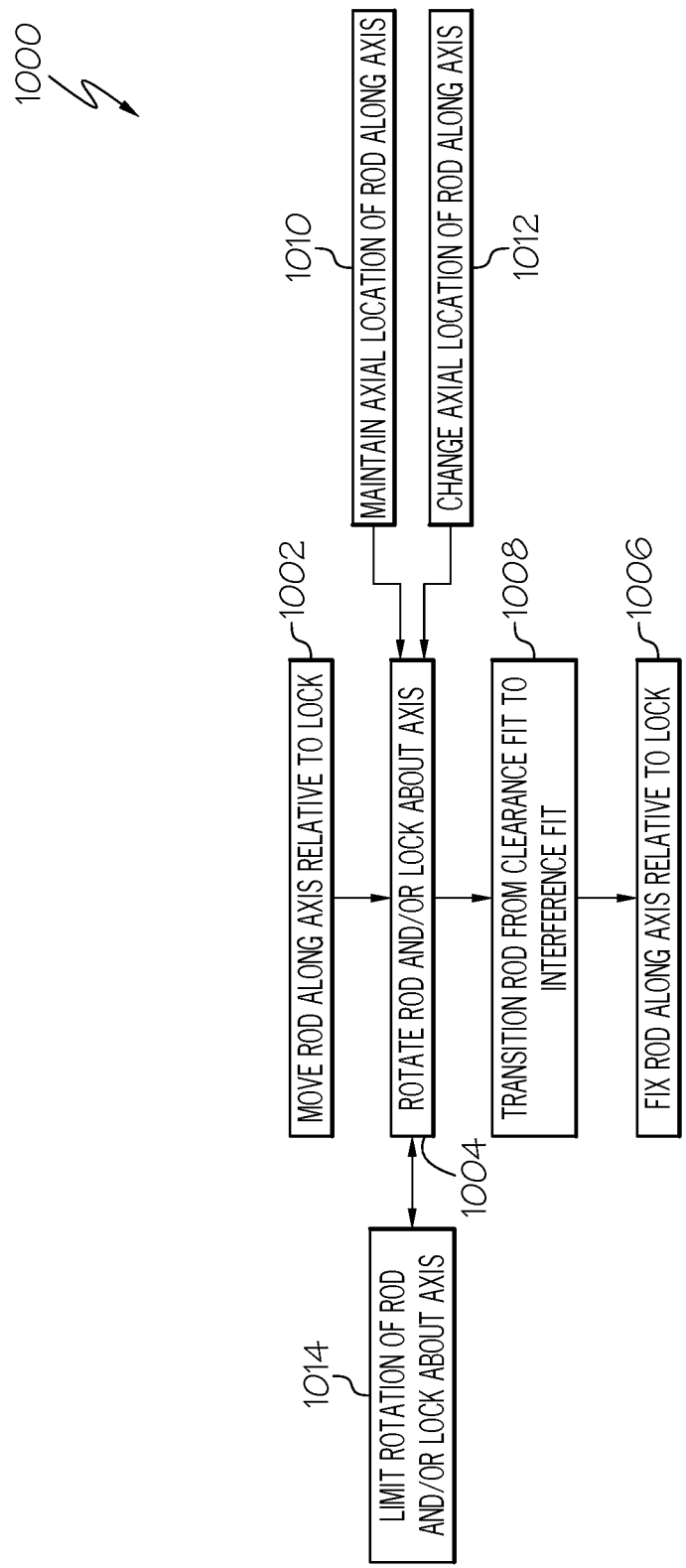
FIG. 26 is a flow diagram of an example of a method for supporting a workpiece.

Referring to FIGS. 1-26, by way of examples, the present disclosure is directed to an axial locking mechanism 100. Referring to FIGS. 1 and 12-15, by way of examples, the present disclosure is also directed to an adaptive tooling fixture 200 that utilizes a plurality of the axial locking mechanisms 100 to support a workpiece. Referring to FIG. 26, by way of examples, the present disclosure is further directed to a method 1000 for supporting the workpiece 204.

Examples of the method 1000 are implemented using one or more of the axial locking mechanisms 100 or the adaptive tooling fixture 200.

As described herein, the adaptive tooling fixture 200 and, more particularly, the axial locking mechanism 100 are used to provide a position adjustable, rigid support for a workpiece 204. In an unlocked state 144, the axial locking mechanism 100 enables a support member to be selectively located to support the workpiece 204. In a locked state 146, the axial locking mechanism 100 enables the support member to be fixed at the selected location. Of particular advantage, the axial locking mechanism 100 utilizes a locking action that does not add any additional load on the workpiece 204 when the axial locking mechanism 100 transitions from the unlocked state 144 to the locked state 146.

Figure 1:
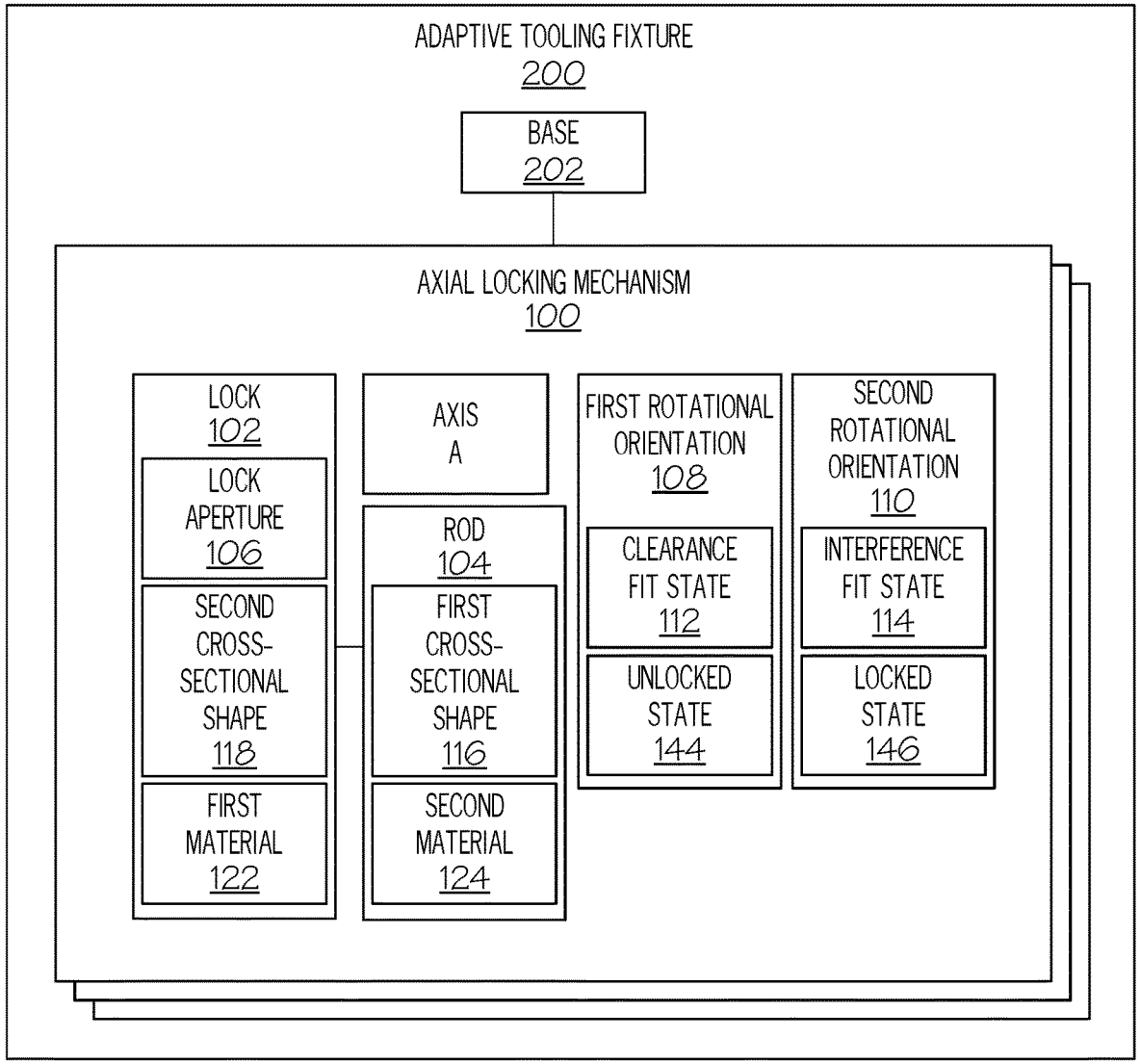
FIG. 1 is a schematic block diagram of an example of an adaptive tooling fixture with axial locking mechanisms.

Referring to FIG. 1, in one or more examples, the axial locking mechanism 100 includes a lock 102 and a rod 104. Interaction between the lock 102 and the rod 104 at different relative rotational orientations facilitates the locking action that restricts axial motion of the rod 104. Generally, the rod 104 is or serves as a support member that physically supports (e.g., holds up, bears the weight of, or otherwise braces) the workpiece 204, such as during a manufacturing operation. The lock 102 is or serves as a securing member that operates to selectively prevent axial movement of the rod 104 relative to the lock 102.

In one or more examples, the lock 102 includes a lock aperture 106. The axial locking mechanism 100 also includes an axis A. The axis A passes through the lock aperture 106 of the lock 102. The rod 104 is receivable by (e.g., within) the lock aperture 106 along the axis A. With the rod 104 received by the lock aperture 106 of the lock 102, the axis A passes through the rod 104. In a first rotational orientation 108 about the axis A, the rod 104 is movable within the lock aperture 106 along the axis A and relative to the lock 102. In a second rotational orientation 110 about the axis A, the rod 104 is fixed within the lock aperture 106 along the axis A and relative to the lock 102.

The locking action of the axial locking mechanism 100 is achieved by physical engagement or physical interference between interfacing, contact surfaces of the lock 102 and the rod 104. With the rod 104 received within the lock aperture 106 of the lock 102, at least one of the lock 102 and the rod 104 is rotatable about the axis A between the first rotational orientation 108 and the second rotational orientation 110. Rotational movement of the rod 104 and the lock 102 relative to each other alternates the axial locking mechanism 100 between the unlocked state 144 and the locked state 146. With the axial locking mechanism 100 in the first rotational orientation 108 and, thus, in the unlocked state 144, the rod 104 is freely movable along the axis A, within the lock aperture 106, and relative to the lock 102. Moving the rod 104 along the axis A and relative to the lock 102 enables the rod 104 to be suitably positioned relative to the lock 102 and/or the workpiece 204, as desired, to support the workpiece 204. With the axial locking mechanism 100 in the second rotational orientation 110 and, thus, in the locked state 146, the rod 104 is fixed along the axis A, within the lock aperture 106, and relative to the lock 102. Fixing the rod 104 along the axis A and relative to the lock 102 enables the rod 104 to be securely held at the selected position to support the workpiece 204 and to be supported by the lock 102. As used herein, the terms "fixed," "fixing," and like terms and phrases refer to a temporary state of connection and motion. For example, the rod 104 being fixed along the axis A means that the rod 104 and the lock 102 are connected and that axial motion of the rod 104 along the axis A and relative to the lock 102 is restricted or prevented under normal operating conditions or under normal loading conditions.

For the purpose of the present disclosure, the first rotational orientation 108 refers to a rotational orientation of the lock 102 relative to the rod 104, a rotational orientation of the rod 104 relative to the lock 102, or both. Similarly, the second rotational orientation 110 refers to a rotational orientation of the lock 102 relative to the rod 104, a rotational orientation of the rod 104 relative to the lock 102, or both.

As an example, the rod 104 is rotatable about the axis A relative to the lock 102 between the first rotational orientation 108 and the second rotational orientation 110. In these examples, with the rod 104 within the lock aperture 106, the rod 104 rotates about the axis A relative to the lock 102 and the lock 102 remains rotationally fixed about the axis A.

As another example, the lock 102 is rotatable about the axis A relative to the rod 104 between the first rotational orientation 108 and the second rotational orientation 110. In these examples, with the rod 104 within the lock aperture 106, the lock 102 rotates about the axis A relative to the rod 104 and the rod 104 remains rotationally fixed about the axis A.

As yet another example, the lock 102 and the rod 104 are rotatable about the axis A relative to each other between the first rotational orientation 108 and the second rotational orientation 110. In these examples, with the rod 104 within the lock aperture 106, the lock 102 rotates about the axis A relative to the rod 104 and the rod 104 rotates about the axis A relative to the lock 102.

Figure 2:
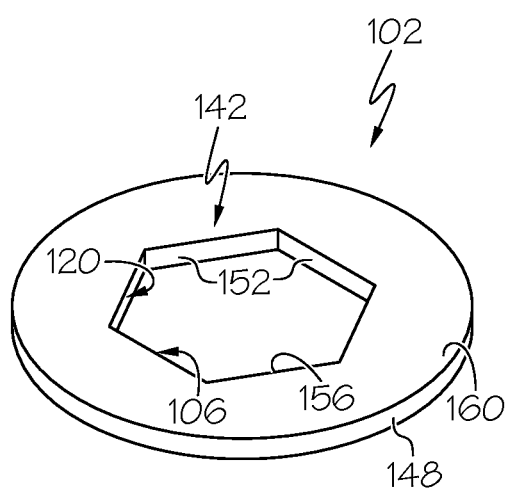
FIG. 2 is a schematic, perspective view of an example of a lock of the axial locking mechanism.

FIG. 2 illustrates an example of the lock 102. In one or more examples, the lock 102 includes a body 148. The lock aperture 106 takes the form of a hole formed through the body 148. In one or more examples, the body 148 is a relatively thin and at least approximately planar member, such as a flat, plate-like member. In one or more examples, the lock aperture 106 is in the approximate middle of the body 148. In one or more examples, the lock 102 is or takes the form of a washer. The body 148 of the lock 102 can have any suitable two-dimensional (e.g., outer perimeter) shape viewed along the axis A. As an example, and as illustrated in FIG. 2, the body 148 is circular or disk-shaped. As another example, the body 148 is square or has another shape.

Figure 3:
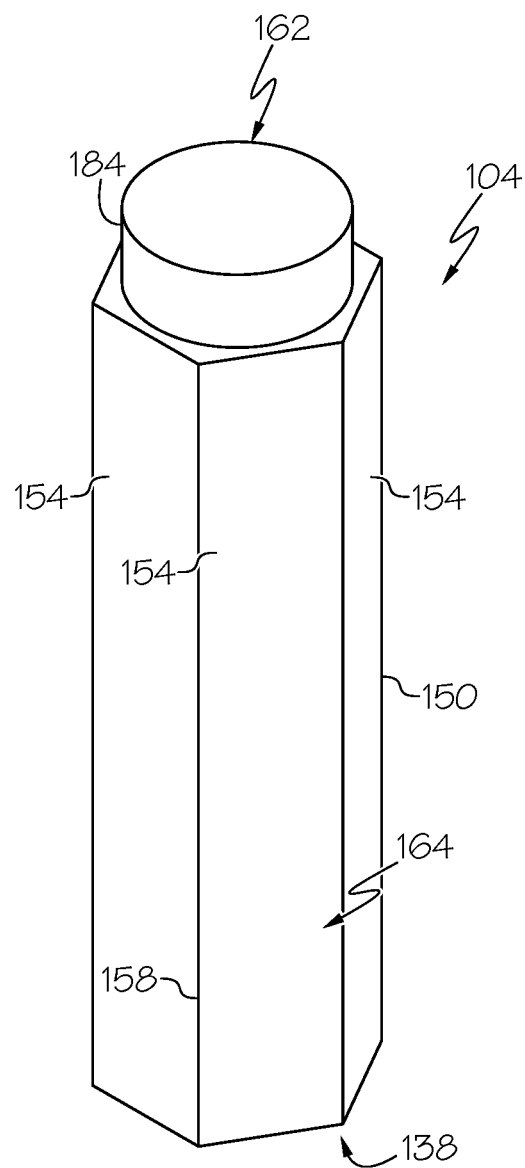
FIG. 3 is a schematic, perspective view of an example of a rod of the axial locking mechanism.
Figure 4:
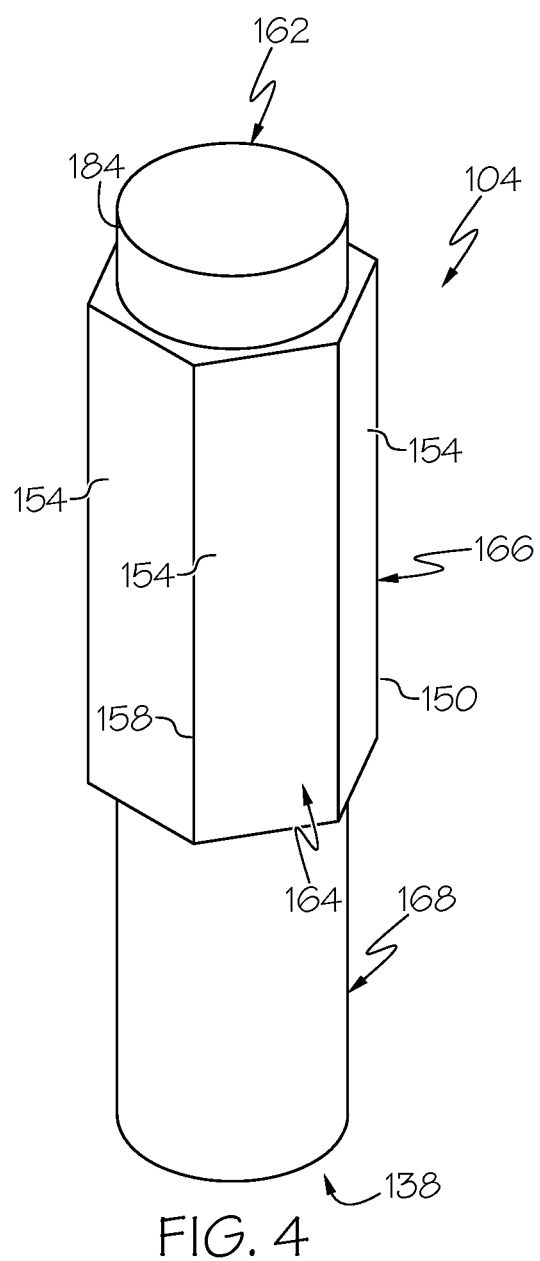
FIG. 4 is a schematic, perspective view of an example of the rod of the axial locking mechanism.

FIGS. 3 and 4 illustrate examples of the rod 104. In one or more examples, the rod 104 includes a shaft 150, a first rod end 138, and a second rod end 162 opposite the first rod end 138 along the axis A. In one or more examples, the shaft 150 is at least approximately straight and relatively slender. At least a portion of the shaft 150 of the rod 104 is suitably sized and shaped to be inserted within and to pass through the lock aperture 106. At least a portion of the shaft 150 of the rod 104 is suitably sized and shaped as to be movable along the axis A when in the first rotational orientation 108. At least a portion of the shaft 150 of the rod 104 is suitably sized and shaped as to become interlocked with the lock 102 when in the second rotational orientation 110.

In one or more examples, rotation of at least one of the rod 104 and the lock 102 about the axis A from the first rotational orientation 108 to the second rotational orientation 110 transitions the rod 104 from a clearance fit state 112 within the lock aperture 106 to an interference fit state 114 within the lock aperture 106. In one or more examples, the clearance fit state 112 achieved in the first rotational orientation 108 refers to an instance in which there is some minimum clearance between a lock surface 142 forming the lock aperture 106 of the lock 102 and a rod surface 164 of the rod 104. For example, in the first rotational orientation 108, a cross-sectional dimension of the rod 104 is less than a cross-sectional dimension of the lock aperture 106 along any virtual line that is perpendicular to the axis A. In one or more examples, the interference fit state 114 achieved in the second rotational orientation 110 refers to an instance in which there is at least a tight fit between the lock surface 142 forming the lock aperture 106 of the lock 102 and the rod surface 164 of the rod 104 that produces a joint that is held together by friction. For example, in the second rotational orientation 110, a cross-sectional dimension of the rod 104 is greater than a cross-sectional dimension of the lock aperture 106 along at least one virtual line that is perpendicular to the axis A.

In one or more examples, the rod 104 has a first cross-sectional shape 116 viewed along the axis A. The first cross-sectional shape 116 of the rod 104 is formed by the rod surface 164. In one or more examples, the rod surface 164 includes one or more rod faces 154. In these examples, one or more of the rod faces 154 is at least approximately flat. However, in other examples, one or more of the rod faces 154 can have a contour or curved-shape. In one or more examples, each one of the rod faces 154 is disposed at a non-zero angle relative to a directly adjacent one of the rod faces 154. In one or more examples, the rod surface 164 includes one or more rod edges 158. Each one of the rod edges 158 is formed at an intersection of a directly adjacent pair of the rod faces 154. In one or more examples, each one of the rod faces 154 extends along or is at least approximately parallel to the axis A. In one or more examples, each one of the rod edges 158 extends along or is at least approximately parallel to the axis A.

In one or more examples, the rod surface 164 extends an entirety of a length of the rod 104 (e.g., of the shaft 150). For example, as illustrated in FIG. 3, the rod surface 164 having the first cross-sectional shape 116, formed by the rod faces 154, extends from proximate the second rod end 162 to the first rod end 138. In one or more examples, the rod surface 164 extends a portion of the length of the rod 104. For example. as illustrated in FIG. 4, the rod 104 includes a first rod portion 166 and a second rod portion 168. The rod surface 164 having the first cross-sectional shape 116, formed by the rod faces 154, extends from the second rod end 162 along the first rod portion 166. The second rod portion 168 extends from the first rod portion 166 to the first rod end 138 along the axis A. The second rod portion 168 has a cross-sectional shape and/or size (e.g., dimensions) that are different than that of the first rod portion 166.

In one or more examples, the first rod end 138 of the rod 104 is a working end or supporting end of the rod 104 that is configured or intended to contact or engage the workpiece 204. In one or more examples, the second rod end 162 of the rod 104 is a control end or commanded end of the rod 104. For example, the second rod end 162 of the rod 104 can be engaged and/or manipulated to drive linear motion of the rod 104 along the axis A, relative to the lock 102 and/or to drive rotational motion of the rod 104 about the axis A, relative to the lock 102. In one or more examples, the rod 104 includes a head 184 located at the second rod end 162. The head 184 can be configured to be engaged by a hand tool, a hand of an operator, a machine tool, and the like to control relative motion of the rod 104.

In one or more examples, the lock aperture 106 has a second cross-sectional shape 118 viewed along the axis A. The second cross-sectional shape 118 of the lock aperture 106 is formed by a portion of the lock surface 142. In one or more examples, the lock surface 142 includes one or more lock-aperture faces 152. In one or more examples, the lock 102 includes a continuous side wall 120. Generally, the lock-aperture faces 152 circumscribe the axis A and form the continuous side wall 120. The continuous side wall 120 forms a perimeter of the lock aperture 106. In one or more examples, one or more of the lock-aperture faces 152 is at least approximately flat. However, in other examples, one or more of the lock-aperture faces 152 can have a contour or curved-shape. In one or more examples, each one of the lock-aperture faces 152 is disposed at a non-zero angle relative to a directly adjacent one of the lock-aperture faces 152. In one or more examples, the lock surface 142 includes one or more lock edges 156. Each one of the lock edges 156 is formed at an intersection of a directly adjacent pair of the lock-aperture faces 152 and a lock-body face 160. In one or more examples, each one of the lock-aperture faces 152 extends along or is at least approximately parallel to the axis A. In one or more examples, each one of the lock edges 156 extends about or is at least approximately perpendicular to the axis A. In one or more examples, the lock-body face 160 is at least approximately perpendicular to the axis A.

Generally, it is an interaction between the rod surface 164, having the first cross-sectional shape 116, and the lock surface 142 of the lock aperture 106, having the second cross-sectional shape 118, at different relative rotational orientations of the rod 104 and the lock 102 that creates the locking action of the axial locking mechanism 100. As described above, in one or more examples, in the second rotational orientation 110, a joint is formed between the rod 104 and the lock 102 in which the rod surface 164 and the lock surface 142 are held together by friction.

Figure 5:
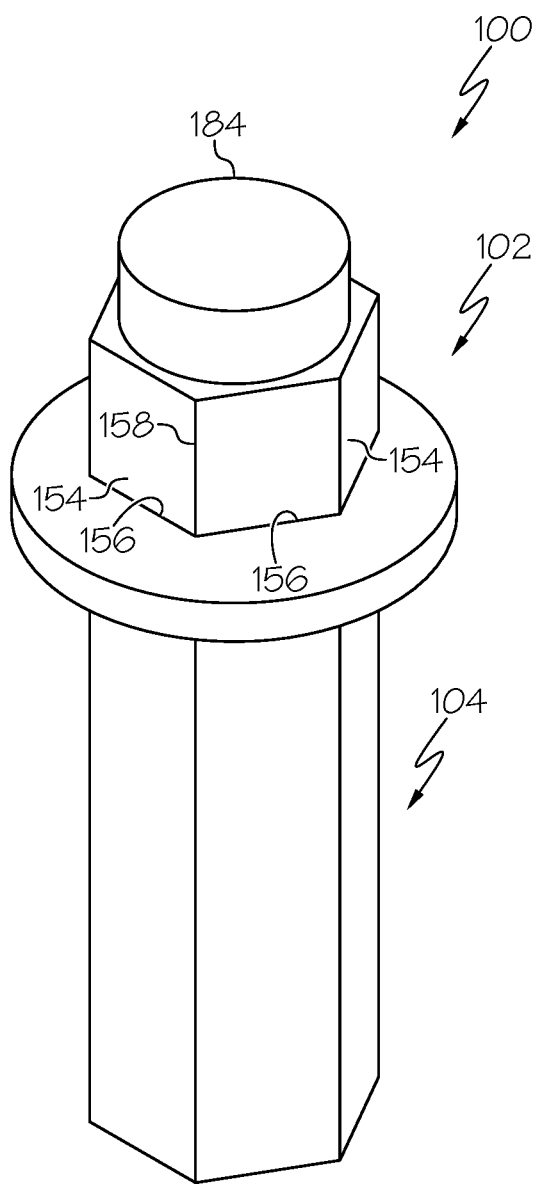
FIG. 5 is a schematic, perspective view of an example of the axial locking mechanism.

Referring to FIG. 5, in one or more examples, in the second rotational orientation 110 about the axis A, the rod 104 and the lock 102 physically interfere with each other. In these examples, in the second rotational orientation 110, a joint is formed between the rod 104 and the lock 102 in which one of the rod surface 164 or the lock surface 142 is deformed by intrusion of the other. The rod surface 164 and the lock surface 142 are held together by the mated deformation created. As an example, in the second rotational orientation 110, a portion of the lock surface 142, such as one or more of the lock edges 156 and/or one or more of the lock-aperture faces 152 digs into, cuts into, gouges into, or is otherwise forced into a portion of the rod surface 164, such as one or more of the rod faces 154 or one or more of the rod edges 158. As another example, in the second rotational orientation 110, a portion of the rod surface 164, such as one or more of the rod edges 158 and/or one or more of the rod faces digs into, cuts into, gouges into, or is otherwise forced into a portion of the lock surface 142, such as one or more of the lock-aperture faces 152 and/or one or more of the lock edges 156.

In one or more examples, the lock 102 includes a first material 122. The rod 104 includes a second material 124. In one or more examples, the first material 122 and the second material 124 are different. In these examples, the different materials of construction of the rod 104 and the lock 102 are selected to enable connection of the rod 104 and the lock 102 by physical intrusion and/or mating deformation between the rod 104 and the lock 102. For example, one of the rod 104 or the lock 102 is made of a relatively harder material and the other one of the rod 104 or the lock 102 is made of a relatively softer material.

In one or more examples, the first material 122 (e.g., relatively harder material) of the lock 102 is harder than the second material 124 (e.g., relatively harder material) of the rod 104. In these examples, when rotated in the second rotational orientation 110, the lock 102 physically intrudes into the rod surface 164 of the rod 104.

In one or more examples, the second material 124 (e.g., relatively harder material) of the rod 104 is harder than the first material 122 (e.g., relatively softer material) of the lock 102. In these examples, when rotated in the second rotational orientation 110, the rod 104 physically intrudes into the lock surface 142 of the lock 102.

In one or more examples, the relatively harder material is or includes steel and the relatively softer material is or includes aluminum or another material that is softer than steel. In one or more examples, the relatively harder material is or includes aluminum and the relatively softer material is or includes plastic, rubber, or another material that is softer than aluminum. Other combinations of different relatively harder materials and the relatively softer materials are also contemplated.

Referring to FIG. 1, in one or more examples, the first cross-sectional shape 116 and the second cross-sectional shape 118 are the same. In one or more examples, the first cross-sectional shape 116 and the second cross-sectional shape 118 are different. In one or more examples, the first cross-sectional shape 116 and the second cross-sectional shape 118 are complementary. In one or more examples, the first cross-sectional shape 116 and the second cross-sectional shape 118 are symmetric. In one or more examples, the first cross-sectional shape 116 and the second cross-sectional shape 118 are asymmetric.

FIGS. 6-15 illustrate examples of the axial locking mechanism 100. FIGS. 6, 8, 10, 12 and 14 illustrate examples of the axial locking mechanism 100 with the rod 104 and the lock 102 in the first rotational orientation 108 relative to each other. As illustrated, in the first rotational orientation 108, the rod 104 and the lock 102 are in the unlocked state 144 or the clearance fit state 112. FIGS. 7, 9, 11, 13 and 15 illustrate examples of the axial locking mechanism 100 with the rod 104 and the lock 102 in the second rotational orientation 110 relative to each other. In the second rotational orientation 110, the rod 104 and the lock 102 are in the locked state 146 or the interference fit state 114.

Figure 7:
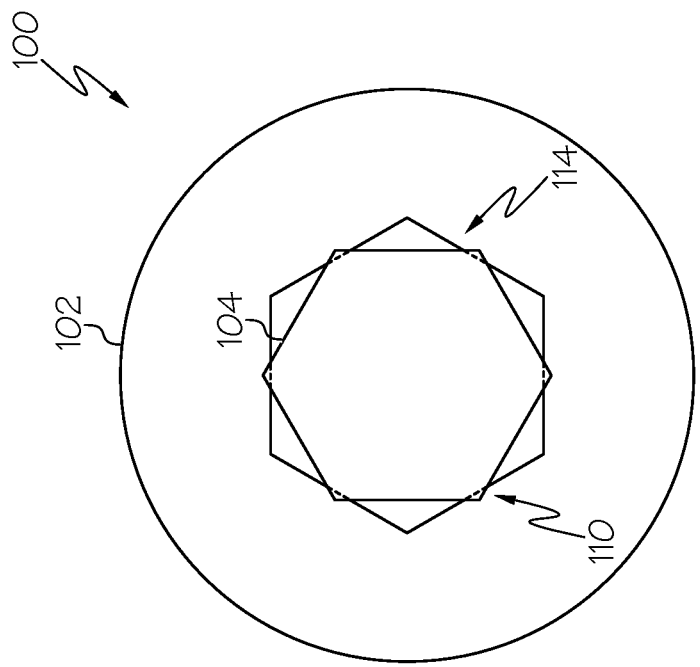
FIG. 7 is a schematic, plan view of an example of the axial locking mechanism of FIG. 6 in a locked state.
Figure 6:
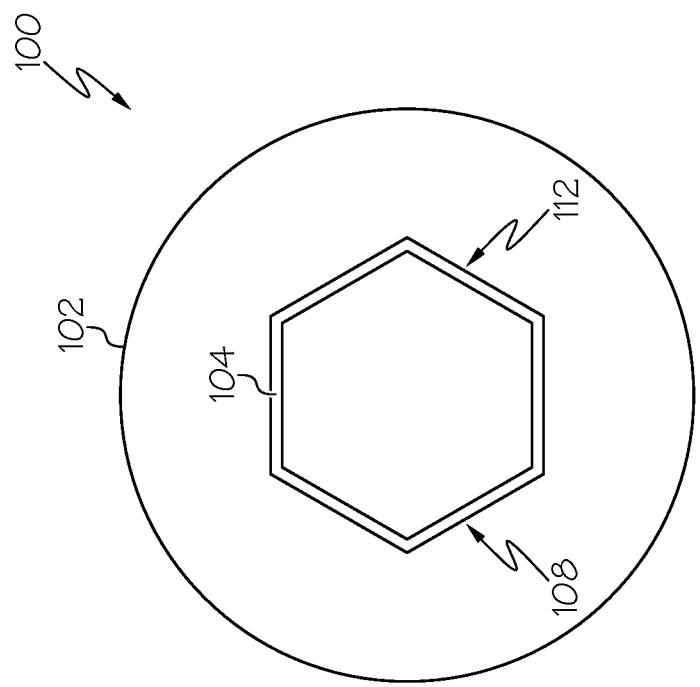
FIG. 6 is a schematic, plan view of an example of the axial locking mechanism in an unlocked state.

Referring to FIGS. 6 and 7, in one or more examples, the first cross-sectional shape 116 and the second cross-sectional shape 118 are polygons. In one or more examples, the first cross-sectional shape 116 and the second cross-sectional shape 118 are a hexagon (e.g., shown in FIGS. 6 and 7). In other examples, the first cross-sectional shape 116 and the second cross-sectional shape 118 can have any other polygonal shape, such as triangular, square, octagonal, etc. As such, the rod 104 and the lock 102 can have any suitable number of rod faces 154 and lock-aperture faces 152, respectively.

Referring to FIGS. 8 and 9, in one or more examples, the first cross-sectional shape 116 and the second cross-sectional shape 118 are irregular shapes. As an example, the first cross-sectional shape 116 and the second cross-sectional shape 118 can include a cam-like shape, for example, having at least one flat portion 170 (e.g., a flat face) and at least one curved portion 172 (e.g., a curved face).

Figure 11:
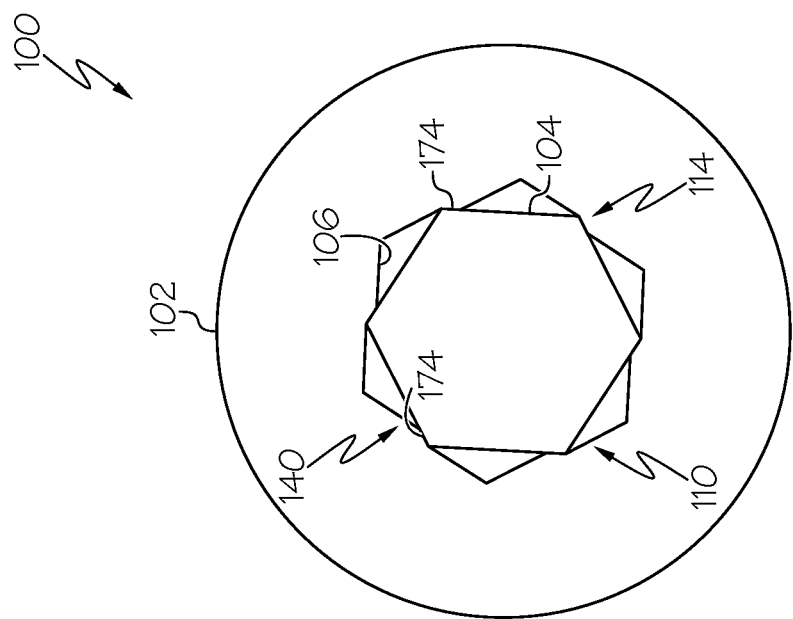
FIG. 11 is a schematic, plan view of an example of the axial locking mechanism of FIG. 10 in a locked state.
Figure 10:
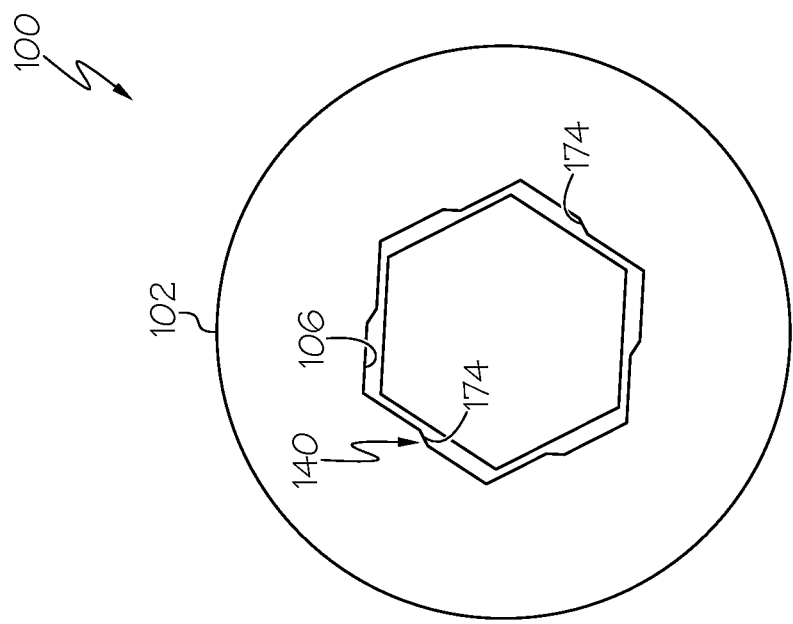
FIG. 10 is a schematic, plan view of an example of the axial locking mechanism in an unlocked state.
Figure 13:
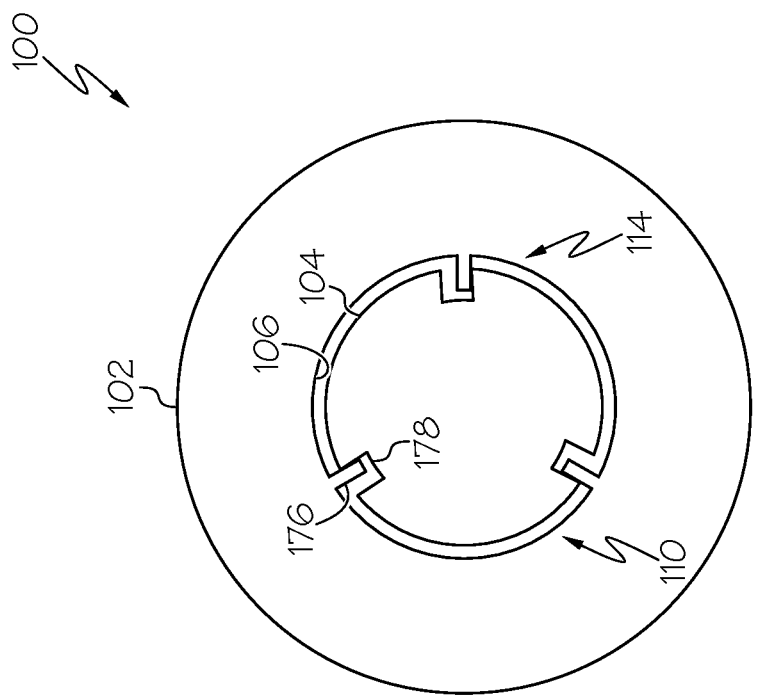
FIG. 13 is a schematic, plan view of an example of the axial locking mechanism of FIG. 12 in a locked state.
Figure 12:
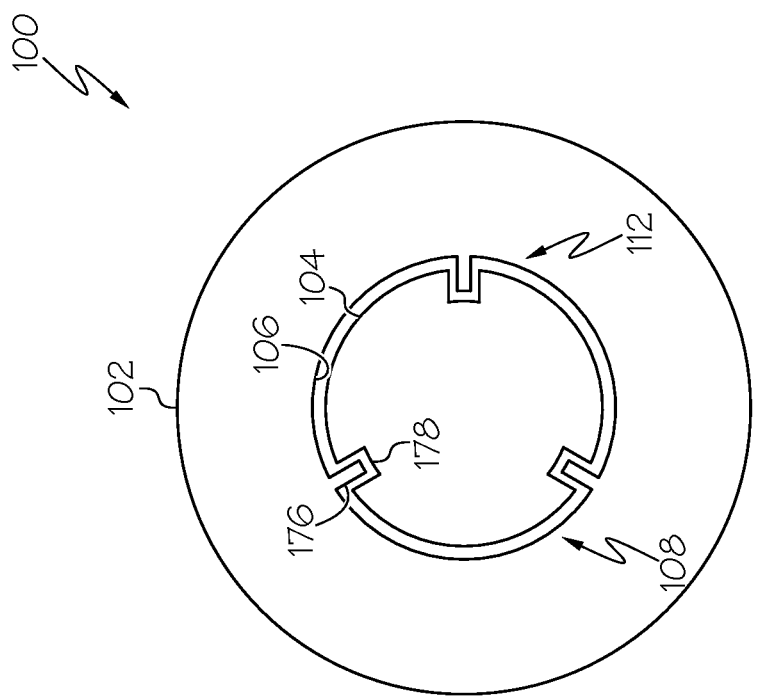
FIG. 12 is a schematic, plan view of an example of the axial locking mechanism in an unlocked state.
Figure 15:
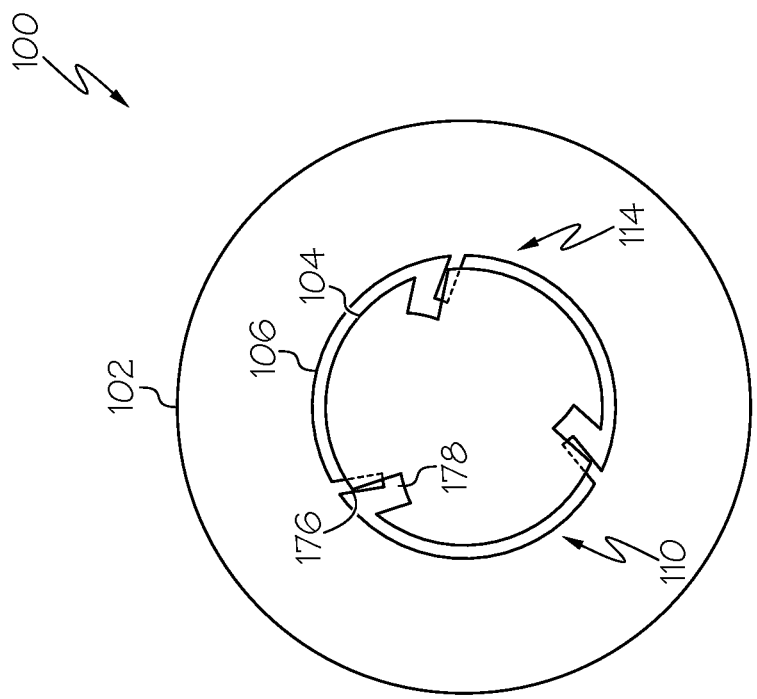
FIG. 15 is a schematic, plan view of an example of the axial locking mechanism of FIG. 14 in a locked state.
Figure 14:
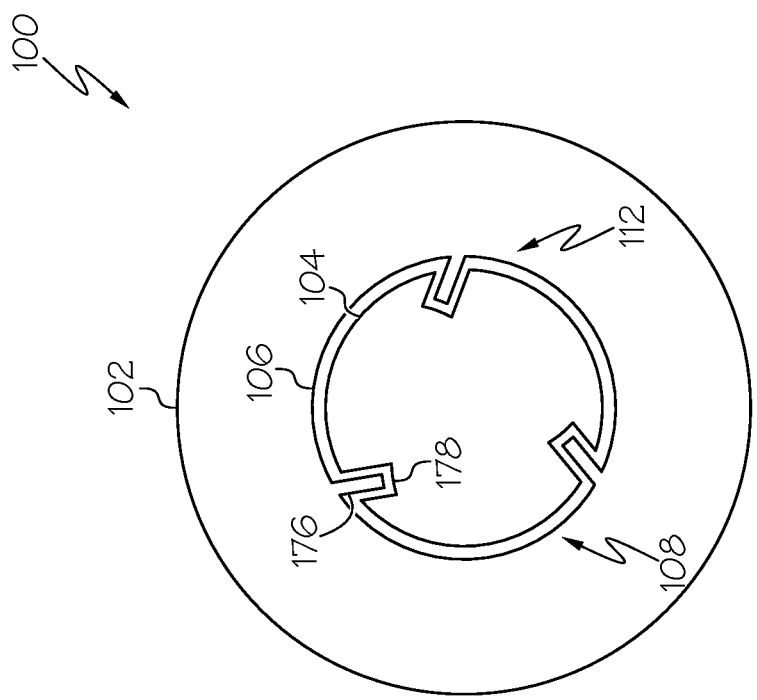
FIG. 14 is a schematic, plan view of an example of the axial locking mechanism in an unlocked state.

Referring to FIGS. 10 and 11, in one or more examples, the lock 102 includes a stop 140. With the rod 104 within the lock aperture 106, the stop 140 limits rotation of the rod 104 about the axis A relative to the lock 102 limits rotations of the lock 102 about the axis A relative to the rod 104. In one or more examples, the stop 140 includes or is formed by one or more notches 174. Each one of the notches 174 projects from a corresponding one of the lock-aperture faces 152 or is otherwise formed by an indentation formed along the corresponding one of the lock-aperture faces 152. Generally, a face or an edge of the notch 174 forms a hard stop that limits rotational motion of the rod 104 and the lock 102 relative to each other.

Referring to FIGS. 12-15, in one or more examples, the one of the rod 104 or the lock 102 includes one or more protrusions 176 projecting radially (e.g., inward or outward, respectively) and the other one of the rod 104 or the lock 102 includes one or more recesses 178 depending radially (e.g., outward or inward, respectively). Generally, the protrusions 176 and the recesses 178 have complementary and matching shapes such that, when in the first rotational orientation 108 (FIGS. 12 and 14), the protrusions 176 are received within the recesses 178 without restricting axial motion of the rod 104 along the axis A.

Figure 16:
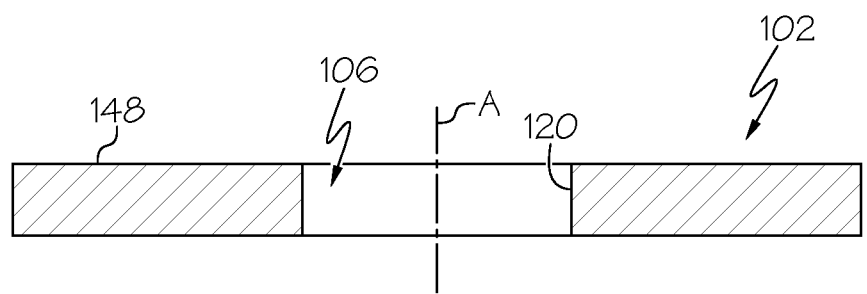
FIG. 16 is a schematic, section view of an example of the lock of the axial locking mechanism.

Referring to FIG. 16, in one or more examples, the continuous side wall 120 of the lock 102, forming the lock aperture 106, is parallel to the axis A (e.g., to a plane that is parallel to the axis A). In these examples, an axial location of the rod 104 along the axis A remains fixed during rotational motion about the axis A from the first rotational orientation 108 to the second rotational orientation 110. Preventing axial movement of the rod 104 along the axis A during locking of the axial locking mechanism 100 advantageously prevents application of an undesirable load (e.g., pre-load) on the workpiece 204 during the supporting process.

Figure 17:
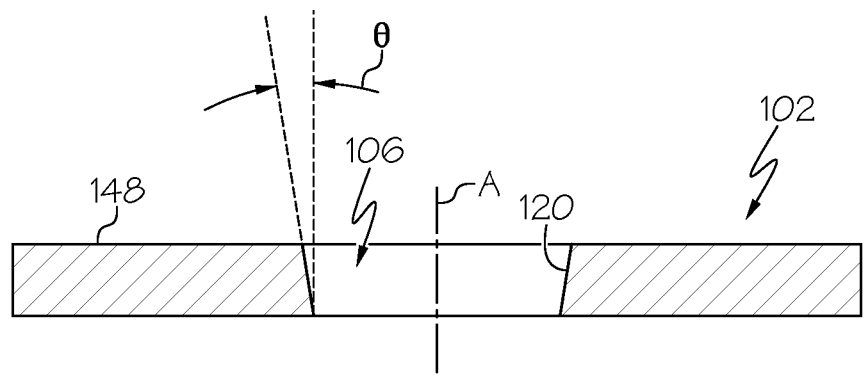
FIG. 17 is a schematic, section view of an example of the lock of the axial locking mechanism.

Referring to FIG. 17, in one or more examples, the continuous side wall 120 is orientated at an oblique angle $\ominus$ relative to the axis A (e.g., to a plane that is parallel to the axis A). In these examples, an axial location of the rod 104 along the axis A changes during rotational motion about the axis A from the first rotational orientation 108 to the second rotational orientation 110. In one or more examples, the amount (e.g., distance) of axial movement of the rod 104 along the axis A can be selected or tailored to a predetermined, expected, or desired amount based on the angle $\ominus$. In certain applications, a small degree of controlled axial motion of the rod 104 along the axis A (e.g., toward the workpiece 204 or away from the workpiece 204) is desirable or advantageous.

Figure 18:
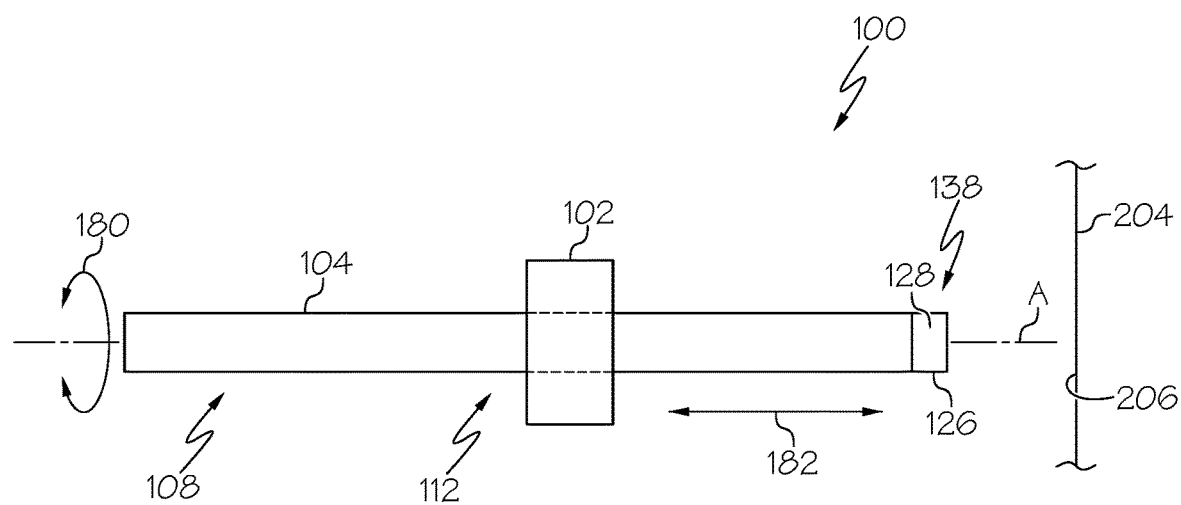
FIG. 18 is a schematic illustration of an example of the axial locking mechanism in an unlocked state.
Figure 19:
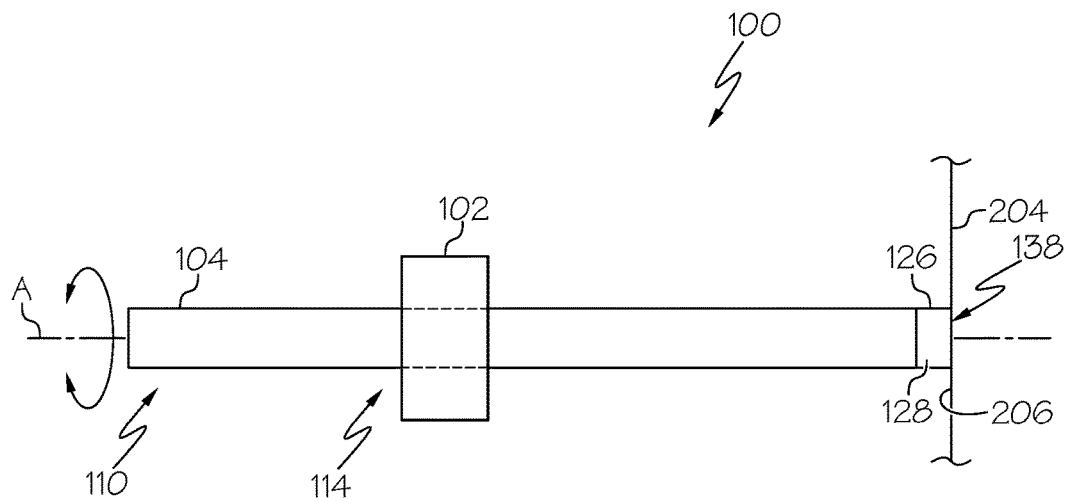
FIG. 19 is a schematic illustration of an example of the axial locking mechanism in a locked state.

FIGS. 18 and 19 illustrate an example of the axial locking mechanism 100 being used to support a portion of the workpiece 204. FIG. 18 illustrate an example of the axial locking mechanism 100 with the rod 104 and the lock 102 in the first rotational orientation 108 relative to each other. As illustrated, in the first rotational orientation 108, the rod 104 and the lock 102 are in the unlocked state 144 or the clearance fit state 112. At least one of the rod 104 and the lock 102 are rotatable about the axis A relative to each other (e.g., in the directions of rotational directional arrow 180). In the first rotational orientation 108, the rod 104 is linearly movable along the axis A relative to the lock 102 (e.g., in the directions of linear directional arrow 182) to position the first rod end 138 of the rod 104 into contact with a workpiece surface 206 of the workpiece 204 (e.g., as shown in FIG. 19). FIG. 19 illustrate an example of the axial locking mechanism 100 with the rod 104 and the lock 102 in the second rotational orientation 110 relative to each other. As illustrated, in the second rotational orientation 110, the rod 104 and the lock 102 are in the locked state 146 or the interference fit state 114. With the rod 104 linearly moved along the axis A relative to the lock 102 into contact with the workpiece surface 206 of the workpiece 204, at least one of the rod 104 and the lock 102 is rotated about the axis A relative to each other (e.g., in the directions of rotational directional arrow 180) from the first rotational orientation 108 to the second rotational orientation 110.

In one or more examples, the axial locking mechanism 100 includes a cushion 126. The cushion 126 is located on the first rod end 138 of the rod 104. The cushion 126 is configured to engage the workpiece surface 206. In one or more examples, the axial locking mechanism 100 includes an adhesive 128. In one or more examples, the adhesive 128 is located on the first rod end 138 of the rod 104. In one or more examples, the adhesive 128 is located on or over the cushion 126. In one or more examples, the adhesive 128 is or forms the cushion 126. In one or more examples, the adhesive 128 is an epoxy.

Figure 20:
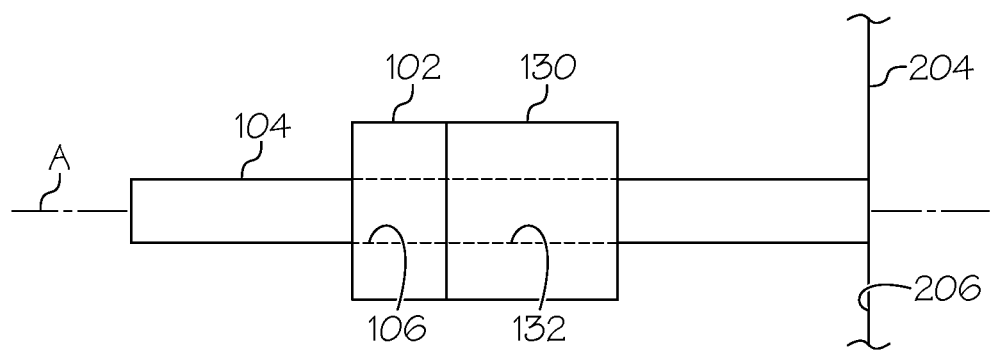
FIG. 20 is a schematic illustration of an example of the axial locking mechanism.

Referring to FIG. 20, in one or more examples, the axial locking mechanism 100 includes a guide 130. The guide 130 includes a guide aperture 132. The axis A passes through the guide aperture 132. The rod 104 is receivable by the guide aperture 132 along the axis A. The guide 130 assists with and directs axial motion of the rod 104 along the axis A relative to the lock 102 and the guide 130. As an example, the guide 130 maintains the rod 104 parallel with or coincident with the axis A during axial motion. In one or more examples, the guide 130 is a tubular element with a hollow core that forms the guide aperture 132.

Figure 21:
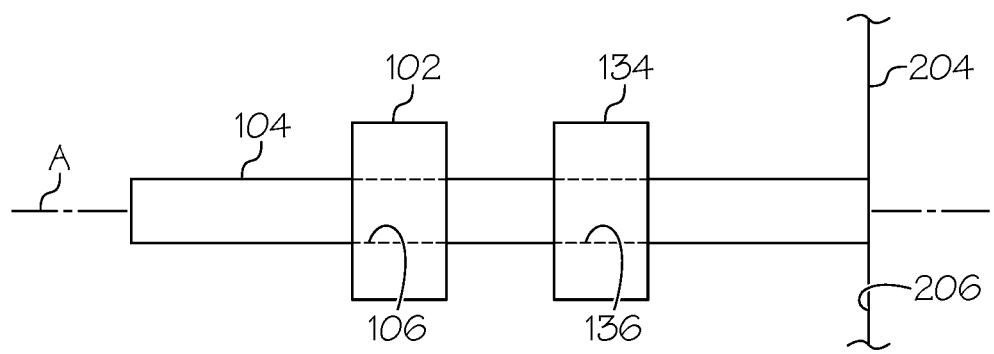
FIG. 21 is a schematic illustration of an example of the axial locking mechanism.
Figure 22:
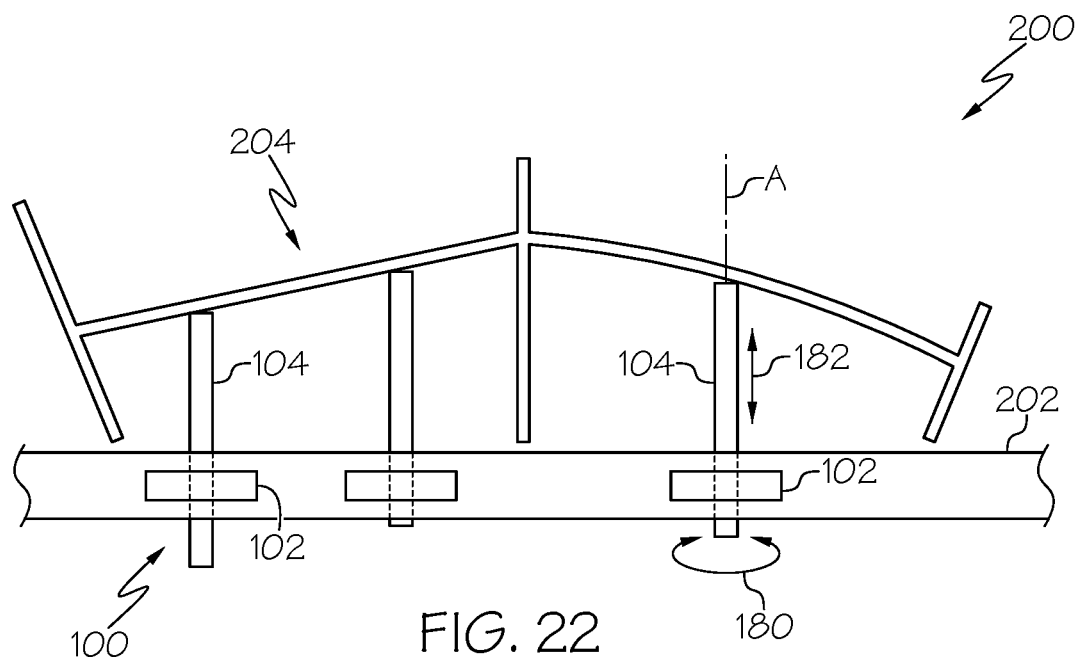
FIG. 22 is a schematic illustration of an example of the adaptive tooling fixture that utilizes a plurality of the axial locking mechanisms.

Referring to FIG. 21, in one or more examples, the axial locking mechanism 100 includes a second lock 134. The second lock 134 includes a second lock aperture 136. The axis A passes through the second lock aperture 136. The second lock 134 is spaced apart from the lock 102 along the axis A. The rod 104 is receivable by the second lock aperture 136 along the axis A. In the first rotational orientation 108 about the axis A, the rod 104 is movable within the second lock aperture 136 along the axis A and relative to the second lock 134. In the second rotational orientation 110 about the axis A, the rod 104 is fixed within the second lock aperture 136 along the axis A and relative to the second lock 134.

Generally, the second lock 134 performs in substantially the same manner as the lock 102. In one or more examples, the second lock 134 serves as a backup or redundancy for the lock 102. In one or more examples, physical interference or intrusion of the second lock 134 with the rod 104 provides additional locking forces to support the workpiece 204 or otherwise react to loading of the rod 104 from the first rod end 138.

Referring again to FIG. 1, in one or more examples, the adaptive tooling fixture 200 includes a base 202. The adaptive tooling fixture 200 also includes a plurality of the axial locking mechanisms 100. Each one of the axial locking mechanisms 100 is coupled to the base 202. Each one of the axial locking mechanisms 100 includes the lock 102 and the rod 104. In the first rotational orientation 108 about the axis A, the rod 104 is movable within the lock aperture 106 along the axis A and relative to the lock 102. In the second rotational orientation 110 about the axis A, the rod 104 is fixed within the lock aperture 106 along the axis A and relative to the lock 102.

FIGS. 22-25 illustrate examples of the adaptive tooling fixture 200 supporting the workpiece 204 using a plurality of the axial locking mechanisms 100. In one or more examples, the lock 102 of the axial locking mechanism 100 is coupled to or is otherwise embedded within the base 202. In the unlocked state 144, the rod 104 of the axial locking mechanism 100 is linearly movable along the axis A relative to the lock 102 and the base 202 to position the first rod end 138 into contact with the workpiece 204. With the rod 104 of each one of the axial locking mechanisms 100 in contact with and supporting the workpiece 204, the axial locking mechanisms 100 are placed in the locked state 146. In one or more examples, the rod 104 is rotationally movable about the axis A relative to the lock 102 and the base 202 from the first rotational orientation 108 to the second rotational orientation 110. In one or more examples, the lock 102 is rotationally movable about the axis A relative to the rod 104 and the base 202 from the first rotational orientation 108 to the second rotational orientation 110.

Figure 23:
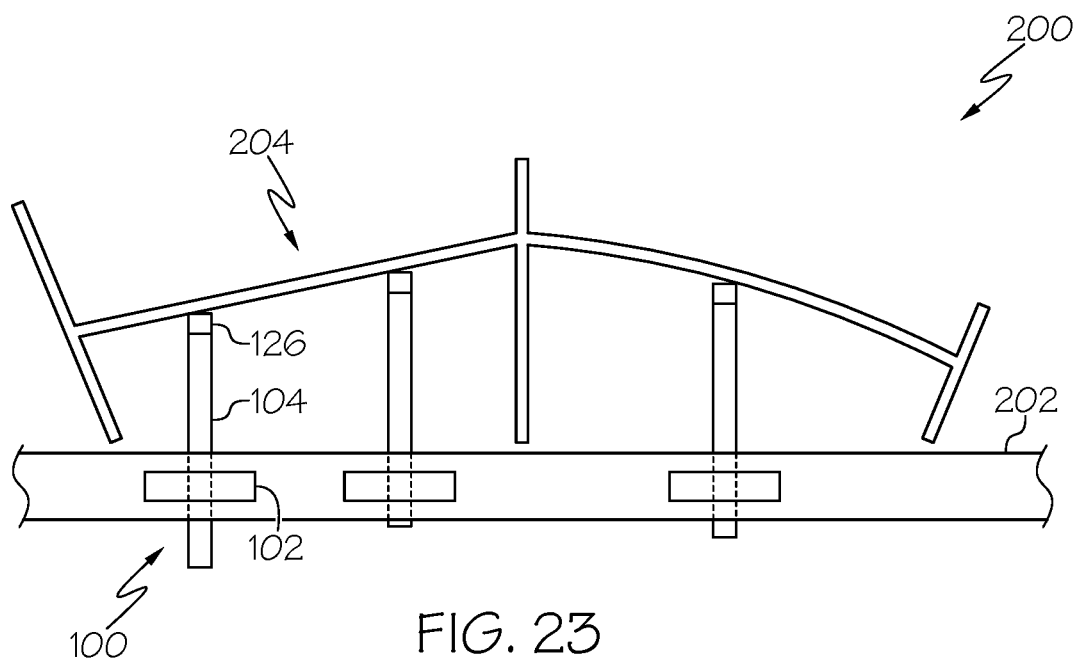
FIG. 23 is a schematic illustration of an example of the adaptive tooling fixture.
Figure 24:
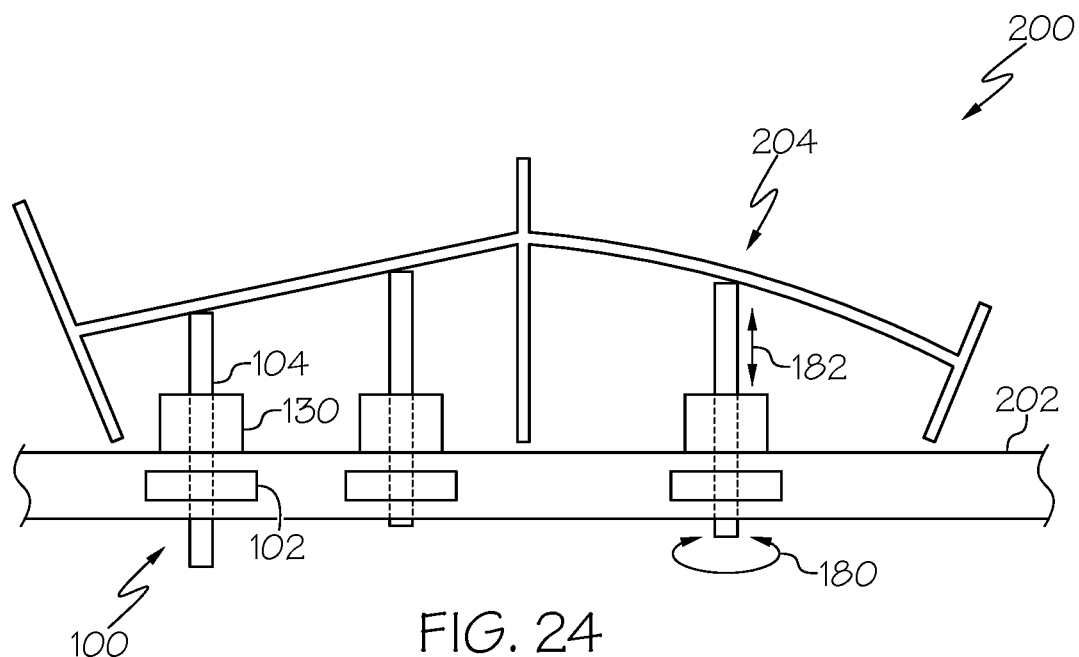
FIG. 24 is a schematic illustration of an example of the adaptive tooling fixture.

FIG. 23 illustrates an example of the adaptive tooling fixture 200 in which one or more of the axial locking mechanisms 100 includes the cushion 126, such as the adhesive 128. FIG. 24 illustrates an example of the adaptive tooling fixture 200 in which one or more of the axial locking mechanisms 100 includes the guide 130. In one or more examples, the guide 130 of each one of the axial locking mechanisms 100 is coupled to the base 202. FIG. 25 illustrates an example of the adaptive tooling fixture 200 in which one or more of the axial locking mechanisms 100 includes the second lock 134. In one or more examples, the second lock 134 of each one of the axial locking mechanisms 100 is coupled to the base 202.

Referring to FIG. 26, in one or more examples, the method 1000 includes a step of (block 1002) in a first rotational orientation 108, moving the rod 104 along the axis A within the lock aperture 106 of the lock 102 until the first rod end 138 of the rod 104 is in contact with the workpiece 204. The method 1000 includes a step of (block 1004) rotating at least one of the rod 104 and the lock 102 about the axis A to a second rotational orientation 110. The method 1000 includes a step of (block 1006) in the second rotational orientation 110, fixing the rod 104 along the axis A within the lock aperture 106.

In one or more examples, the method 1000 includes a step of (block 1008) transitioning the rod 104 from the clearance fit state 112 to the interference fit state 114 within the lock aperture 106. In one or more examples, the step of (block 1004) rotating at least one of the rod 104 and the lock 102 about the axis A from the first rotational orientation 108 to the second rotational orientation 110 results in the step of (block 1008) transitioning the rod 104 from the clearance fit state 112 to the interference fit state 114 within the lock aperture 106. In these examples, the step of (block 1008) transitioning results in the step of (block 1006) fixing the rod 104 along the axis A within the lock aperture 106.

In one or more examples, the method 1000 includes a step of (block 1010) maintaining an axial location of the rod 104 along the axis A during the step of (block 1004) rotating the rod 104 about the axis A.

In one or more examples, the method 1000 includes a step of (block 1012) changing an axial location of the rod 104 along the axis A during the step of (block 1004) rotating the rod 104 about the axis A.

In one or more examples, the method 1000 includes a step of (block 1014) limiting rotation of at least one of the rod 104 and the lock 102 about the axis A relative to each other.

Accordingly, examples of the axial locking mechanism 100 described herein provide a rigid support that contacts the workpiece 204 but that does not add additional loads on the workpiece (e.g., does not "push" on the workpiece when locked in a fixed axial position). In some examples, the axial locking mechanism 100 includes a fixed washer with a hexagonal shaped orifice (e.g., hex-washer) and a hexagonal rod (e.g., hex-rod) with an adhesive on a distal end. The rod is capable of sliding in or out of the fixed washer and is made from a softer material than the washer. One particularly advantageous feature is that the locking action does not move the rod in the axial direction. In other words, once positioned, the locking action will not cause a change in that position to avoid unknown loads on the workpiece. In some examples, the hex-washer is mounted to a fixture plate of the adaptive tooling fixture 200. In some examples, the hex-washer orifice geometry can be modified with notch features to prevent the hex-rod from over rotating while locking. In some examples, including a slight taper to the hex-washer orifice can induce a slight known displacement during locking, which can be useful to ensure that the hex-rod always pulls away from the workpiece surface during locking (e.g., by approximately 0.003 inch) and ensure it will not push the workpiece. Thus, the axial locking mechanism 100 provides a low cost, adjustable rigid support for a wide range of part geometries.

Figure 27:
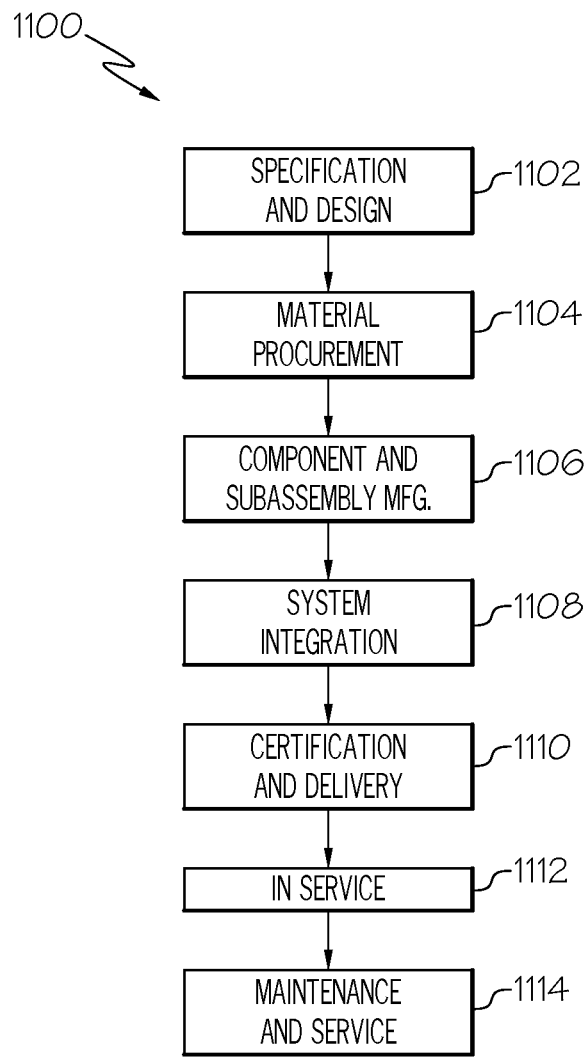
FIG. 27 is a flow diagram of an example of an aircraft manufacturing and service method.
Figure 28:
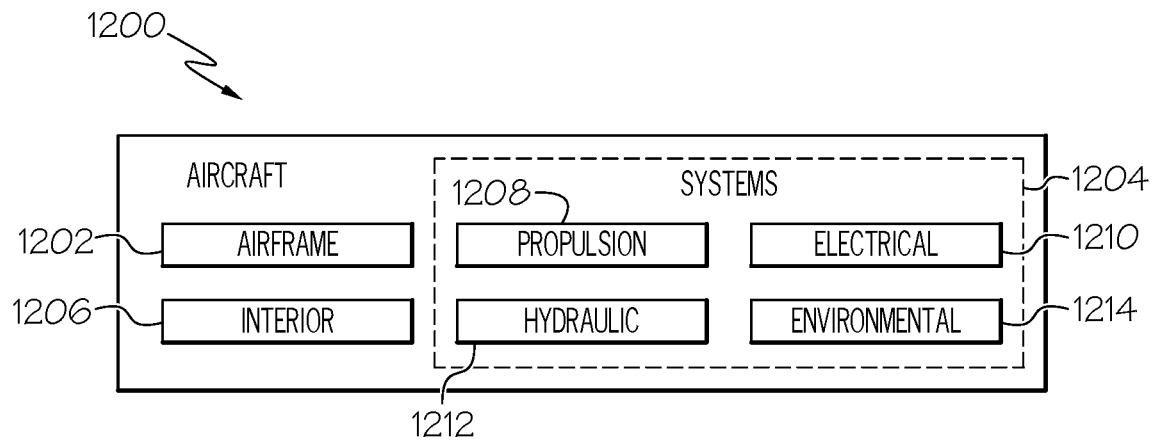
FIG. 28 is a schematic block diagram of an example of an aircraft.

Referring now to FIGS. 27 and 28, examples of the axial locking mechanism 100, the adaptive tooling fixture 200, and the method 1000 described herein, may be related to, or used in the context of, an aircraft manufacturing and service method 1100, as shown in the flow diagram of FIG. 27 and the aircraft 1200, as schematically illustrated in FIG. 28. For example, the aircraft 1200 and/or the aircraft production and service method 1100 may include the workpiece 204 that was supported during manufacture by the axial locking mechanism 100 or the adaptive tooling fixture 200 and/or according to the method 1000.

Referring to FIG. 28, which illustrates an example of the aircraft 1200. The aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various other structures made using the workpiece 204 that was supported during manufacture by the axial locking mechanism 100 or the adaptive tooling fixture 200 and/or according to the method 1000.

Referring to FIG. 27, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 27 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the axial locking mechanism 100, the adaptive tooling fixture 200, and/or the method 1000 shown and described herein, may be employed during any one or more of the stages of the manufacturing and service method 1100 shown in the flow diagram illustrated by FIG. 27. In an example, support the workpiece 204 during manufacture using the axial locking mechanism 100 or the adaptive tooling fixture 200 and/or according to the method 1000 may form a portion of component and subassembly manufacturing (block 1106) and/or system integration (block 1108). Further, workpieces 204 supported during manufacture using the axial locking mechanism 100 or the adaptive tooling fixture 200 and/or according to the method 1000 may be implemented in a manner similar to components or subassemblies prepared while the aircraft 1200 is in service (block 1112). Also, workpieces 204 supported during manufacture using the axial locking mechanism 100 or the adaptive tooling fixture 200 and/or according to the method 1000 may be utilized during system integration (block 1108) and certification and delivery (block 1110). Similarly, workpieces 204 supported during manufacture using the axial locking mechanism 100 or the adaptive tooling fixture 200 and/or according to the method 1000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

As used herein, the phrase "along an axis" such as in reference to a location or a position along an axis, movement along an axis, and similar phrases, refers to an item being positioned or moving at least approximately parallel to or coincident with the axis.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third"or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/"symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-25 and 28, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-25 and 28, referred to above, need be included in every example and not all elements, features, and/or components described herein are necessarily depicted in each illustrative example. Accordingly, some of the elements, features, and/or components described and illustrated in FIGS. 1-25 and 28 may be combined in various ways without the need to include other features described and illustrated in FIGS. 1-25 and 28, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-25 and 28, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-25 and 28, and such elements, features, and/or components may not be discussed in detail herein with reference to each of FIGS. 1-25 and 28. Similarly, all elements, features, and/or components may not be labeled in each of FIGS. 1-25 and 28, but reference numerals associated therewith may be utilized herein for consistency.

In FIGS. 26 and 27, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 26 and 27 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the axial locking mechanism 100, the adaptive tooling fixture 200, and the method 1000 have been shown and described, modifications may occur to those skilled in the art upon reading the specification. The present application includes such modifications and is limited only by the scope of the claims.

What is claimed is:

1. An axial locking mechanism comprising:
 a lock comprising a lock aperture, a continuous side wall forming a perimeter of the lock aperture, and an axis passing through the lock aperture; and
 a rod comprising a rod surface and receivable by the lock aperture along the axis, wherein:
  in a first rotational orientation about the axis, the rod is movable within the lock aperture along the axis and relative to the lock; and
  in a second rotational orientation about the axis, at least a portion of the rod surface of the rod engages at least a portion of the continuous sidewall of the lock such that the rod is fixed within the lock aperture along the axis and relative to the lock.

2. The axial locking mechanism of claim 1, wherein rotation of at least one of the rod and the lock about the axis from the first rotational orientation to the second rotational orientation transitions the rod surface of the rod from a clearance fit state to an interference fit state with the continuous side wall of the lock forming the lock aperture.

3. The axial locking mechanism of claim 1, wherein:
 the rod has a first cross-sectional shape viewed along the axis; and
 the lock aperture has a second cross-sectional shape viewed along the axis.

4. The axial locking mechanism of claim 3, wherein the first cross-sectional shape and the second cross-sectional shape are the same.

5. The axial locking mechanism of claim 3, wherein the first cross-sectional shape and the second cross-sectional shape are polygons.

6. The axial locking mechanism of claim 3, wherein the first cross-sectional shape and the second cross-sectional shape are a hexagon.

7. The axial locking mechanism of claim 3, wherein the first cross-sectional shape and the second cross-sectional shape are different.

8. The axial locking mechanism of claim 1, wherein in the second rotational orientation about the axis, at least a portion of the rod surface of the rod and at least a portion of the continuous side wall of the lock physically interfere with each other.

9. The axial locking mechanism of claim 1, wherein:
 the lock comprises first material;
 the rod comprises a second material; and
 the first material is harder than the second material.

10. The axial locking mechanism of claim 1, wherein:
 the continuous side wall is parallel to a plane that is parallel to the axis; and
 an axial location of the rod along the axis remains fixed during rotational motion about the axis from the first rotational orientation to the second rotational orientation.

11. The axial locking mechanism of Claim 1, wherein:
 the continuous side wall is orientated at an oblique angle relative to a plane that is parallel to the axis; and
 an axial location of the rod along the axis changes during rotational motion about the axis from the first rotational orientation to the second rotational orientation.

12. The axial locking mechanism of claim 1, wherein the lock further comprises a stop that limits rotation of the rod about the axis within the lock aperture.

13. The axial locking mechanism of claim 1, further comprising a cushion located on an end of the rod.

14. The axial locking mechanism of Claim 1, further comprising an adhesive located on an end of the rod.

15. The axial locking mechanism of claim 1, further comprising a guide comprising a guide aperture,
 wherein:
  the axis passes through the guide aperture; and
  the rod is receivable by the guide aperture along the axis.

16. The axial locking mechanism of claim 1, further comprising a second lock comprising a second lock aperture and a second continuous side wall forming a perimeter of the second lock aperture,
 wherein:
  the axis passes through the second lock aperture;
  the second lock is spaced apart from the lock along the axis;
  the rod is receivable by the second lock aperture along the axis;
  in the first rotational orientation about the axis, the rod is movable within the second lock aperture along the axis and relative to the second lock; and
  in the second rotational orientation about the axis, at least a second portion of the rod surface of the rod engages at least a portion of the second continuous sidewall of the lock such that the rod is fixed within the second lock aperture along the axis and relative to the second lock.

17. An adaptive tooling fixture comprising:
 a base; and
 a plurality of axial locking mechanisms coupled to the base,
 wherein:
  each one of the axial locking mechanisms comprises:
   a lock comprising a lock aperture, a continuous side wall forming a perimeter of the lock aperture, and an axis passing through the lock aperture; and
   a rod comprising a rod surface and insertable through the lock aperture along the axis,
   in a first rotational orientation about the axis, the rod is movable within the lock aperture along the axis and relative to the lock; and
   in a second rotational orientation about the axis, at least a portion of the rod surface of the rod engages at least a portion of the continuous sidewall of the lock such that the rod is fixed within the lock aperture along the axis and relative to the lock.

18. The adaptive tooling fixture of claim 17, wherein rotation of at least one of the rod and the lock about the axis from the first rotational orientation to the second rotational orientation transitions the rod surface of the rod from a clearance fit state to an interference fit state with the continuous side wall of the lock forming the lock aperture.

19. A method for supporting a workpiece, the method comprising steps of:
 in a first rotational orientation, moving a rod along an axis within a lock aperture of a lock until a first rod end of the rod is in contact with the workpiece;
 rotating at least one of the rod and the lock about the axis to a second rotational orientation; and in the second rotational orientation, engaging at least a portion of a rod surface of the rod with at least a portion of a continuous sidewall of the lock that forms a perimeter of the lock aperture, thereby fixing the rod along the axis within the lock aperture.

20. The method of claim 19, wherein the step of rotating at least one of the rod and the lock about the axis from the first rotational orientation to the second rotational orientation transitions the rod surface of the rod from a clearance fit state to an interference fit state with the continuous side wall of the lock forming the lock aperture.

* * * * *